US010524114B2

(12) United States Patent
Li et al.

(10) Patent No.: US 10,524,114 B2
(45) Date of Patent: Dec. 31, 2019

(54) SUBSCRIPTION FALL-BACK IN A RADIO COMMUNICATION NETWORK

(71) Applicant: Telefonaktiebolaget LM Ericsson (publ), Stockholm (SE)

(72) Inventors: Qiang Li, Täby (SE); Justus Petersson, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 100 days.

(21) Appl. No.: 15/127,437

(22) PCT Filed: Apr. 10, 2014

(86) PCT No.: PCT/SE2014/050444
§ 371 (c)(1),
(2) Date: Sep. 20, 2016

(87) PCT Pub. No.: WO2015/156716
PCT Pub. Date: Oct. 15, 2015

(65) Prior Publication Data
US 2017/0150344 A1    May 25, 2017

(51) Int. Cl.
*H04B 1/38* (2015.01)
*H04W 8/18* (2009.01)
(Continued)

(52) U.S. Cl.
CPC .......... *H04W 8/183* (2013.01); *H04B 1/3816* (2013.01); *H04L 63/0876* (2013.01);
(Continued)

(58) Field of Classification Search
None
See application file for complete search history.

(56) References Cited

U.S. PATENT DOCUMENTS 8,254,981 B2   8/2012   Dwyer et al.
8,644,178 B1   2/2014   Oroskar
(Continued)

FOREIGN PATENT DOCUMENTS

WO   2012085593 A1   6/2012

OTHER PUBLICATIONS

GSM Association Official Document 12FAST.15—Remote Architecture for Embeddded UICC Technical Specification, version 1.0; Dec. 17, 2013.*
EXALTED, "Expanding LTE for Devices", Large Scale Integrating Project, FP7 Contract No. 258512, WP5—Security, Authentication & Provisioning, Deliverable 5.1: Security and Provisioning Solutions, Feb. 29, 2012, pp. 1-115, EXALTED.
(Continued)

*Primary Examiner* — Gary Lafontant
(74) *Attorney, Agent, or Firm* — Coats & Bennett, PLLC

(57) ABSTRACT

The present disclosure relates to a method performed by a connectivity service platform (2) in a communication network (1). The method comprises receiving a request message (9) from a radio device (5) via a wireless network connection of a second subscription of the radio device. The method also comprises observing that the connectivity service platform is not enabled to communicate with the radio device via the wireless network connection of the second subscription. The method also comprises determining that the received request message is associated with a fall-back attribute. The method also comprises activating the second subscription in the connectivity service platform in response to the received request message, thereby enabling the connectivity service platform to communicate with the radio device via the wireless network connection of said second subscription of the radio device.

17 Claims, 4 Drawing Sheets

(51) Int. Cl.
    *H04B 1/3816*     (2015.01)
    *H04L 29/06*     (2006.01)
    *H04W 4/14*     (2009.01)
    *H04W 60/04*     (2009.01)
    *H04L 29/12*     (2006.01)

(52) U.S. Cl.
    CPC ............ *H04L 63/101* (2013.01); *H04W 4/14* (2013.01); *H04W 60/04* (2013.01); *H04L 61/6054* (2013.01)

(56) References Cited

U.S. PATENT DOCUMENTS

| | | |
|---|---|---|
| 8,825,044 B2 | 9/2014 | Oroskar et al. |
| 2009/0238143 A1 | 9/2009 | Mukherjee et al. |
| 2010/0062779 A1 | 3/2010 | Bienas et al. |
| 2012/0329521 A1 | 12/2012 | Jacobs et al. |
| 2013/0150032 A1 | 6/2013 | Pattaswamy |
| 2014/0198640 A1 | 7/2014 | Suzuki |
| 2014/0370886 A1 | 12/2014 | Lisak |
| 2015/0156679 A1 | 6/2015 | Li et al. |
| 2015/0312749 A1 | 10/2015 | Li et al. |

OTHER PUBLICATIONS

ETSI, "Smart Cards; Embedded UICC; Requirements Specification (Release 12)", Technical Specification, ETSI TS 103 383 V12.2.0, Sep. 1, 2013, pp. 1-20, ETSI.

GSMA, "Remote Provisioning Architecture for Embedded UICC", Technical Specification, Version 1.0, Dec. 17, 2013, pp. 1-294, GSMA.

GSMA, "Remote Provisioning Architecture for Embedded UICC", Technical Specification, Version 1.43, Jul. 1, 2013, pp. 1-82, GSMA.

ETSI, "Smart Cards; Machine to Machine UICC; Physical and logical characteristics (Release 9)", Technical Specification, ETSI TS 102 671 V9.1.0, Sep. 1, 2011, pp. 1-21, ETSI.

ETSI, "ETSI Technical Committee Smart Card Platform (TC SCP), TS SCP REQ Meeting #38, Osaka, Japan, May 28-30, 2012 Report", ETSI TC SCP Meeting #39, Sep. 24, 2012, pp. 1-24, ETSI.

GSMA, "Embedded SIM Task Force Requirements and Use Cases", Non-confidential white paper, version 1.0, Feb. 21, 2011, pp. 1-38, GSMA.

GSMA, "Embedded SIM Remote Provisioning Architecture", Non-confidential Official Document 12FAST.13, Version 1.1, Dec. 17, 2013, pp. 1-84, GSMA.

GSM Association, "Embedded SIM Task Force Requirements and Use Cases", Non-Confidential White paper, Feb. 21, 2011, pp. 1-38, version 1.0, GSMA.

\* cited by examiner

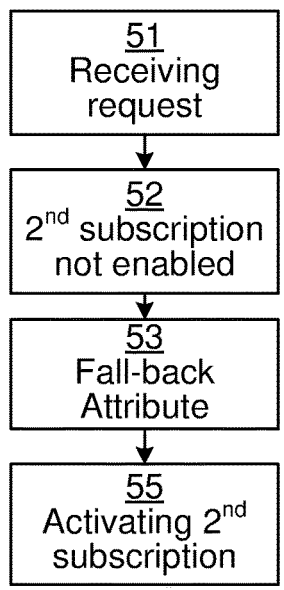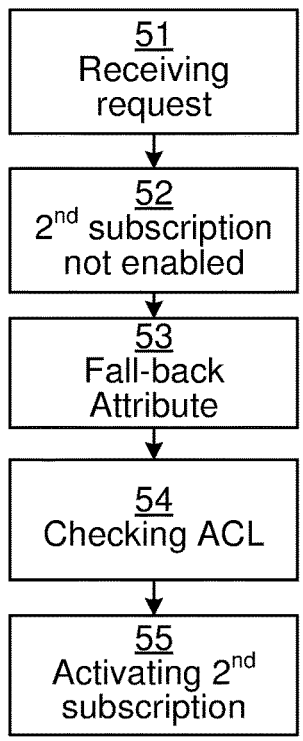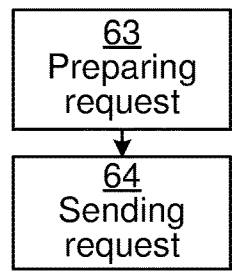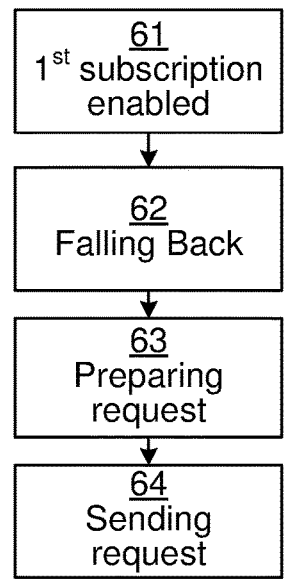
Fig. 5a
Fig. 5b
Fig. 6a
Fig. 6b

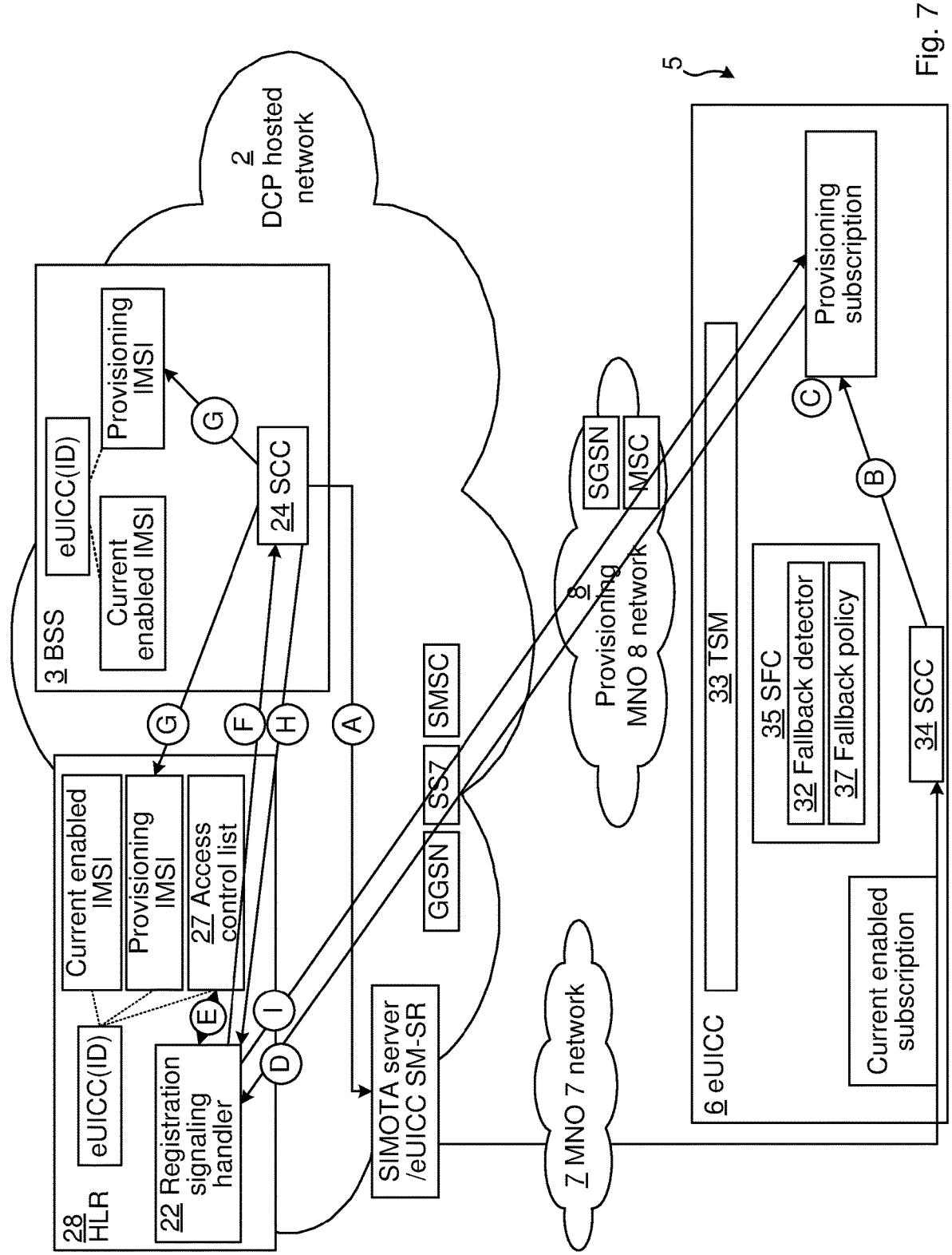

SUBSCRIPTION FALL-BACK IN A RADIO COMMUNICATION NETWORK

TECHNICAL FIELD

The present disclosure relates to methods and devices of a communication network for managing subscriptions for wireless connection of a radio device, e.g. a radio device having an embedded Universal Integrated Circuit Card (eUICC).

BACKGROUND

Unlike a traditional UICC Subscriber Identity Module (SIM) card used in a consumer device, e.g. a mobile phone, all eUICC that are deployed in e.g. Machine-to-Machine (M2M) solutions and embedded into the M2M device cannot easily be accessed by human intervention to switch the SIM card manually during the device life cycle. According to the Global System for Mobile Communications (GSM) Association (GSMA) eUICC standard (GSMA "Remote Provisioning Architecture for Embedded UICC" DRAFT 1.39 29th April 2013) and European Telecommunications Standards Institute (ETSI) eUICC Standard (EXALTED "Expanding LTE for Devices" FP7 Contract Number: 258512, Feb. 29, 2012), all eUICC shall be delivered with a pre-installed provisioning subscription for remote provisioning/bootstrapping purpose (i.e. a provisioning/bootstrapping operator provides initial bootstrapping connectivity for eUICC in order to enable late binding feature i.e. to remotely provision the $1^{st}$ eUICC operational subscription to the eUICC when the device (e.g. a car) comprising the eUICC is shipped from initial manufacturer country to the destination country ($1^{st}$ operational subscription could be provided by the local operator from the destination country), and then later to change the eUICC active operational subscription from the current operator subscription to an new operator (due to the location being changed to another country, or changed operator subscription) during the device/eUICC long life cycle (15-20 years), in order to avoid high roaming fee and/or single operator lock-in situation during the device long life cycle e.g. in the automotive industry or for smart metering/security cameras etc. However, eUICC connectivity may be lost permanently during subscription management lifecycle through operations such as enable/disable/activate/pause/deactivate/terminate/etc. In such cases the eUICC and network must fall back to an available subscription to recover the initial connectivity.

Chapter 3.50.12 "Fall-Back Mechanism" of GSMA "Remote Provisioning Architecture for Embedded UICC" DRAFT 1.39 29th April 2013 states that in the event of loss of network connectivity, as detected by the device, there is a need to change to the profile with fall-back attribute set. In this case the eUICC disables the currently enabled Profile (Profile A) and enables the Profile with Fall-back Attribute set (Profile B). The device reports network loss to the eUICC. The eUICC is configured to perform the fall-back mechanism if certain network connectivity issues are reported by the Device.

SUMMARY

Subscriptions of radio devices, e.g. M2M devices, may be handled via a connectivity service platform, e.g. the Ericsson Device Connection Platform (DCP) or other hosted core network (CN) or home public land mobile network (Home PLMN or HPLMN) which may be used by several different network operators to manage subscriptions for radio devices having eUICC (since the subscriptions are not handled manually by inserting a UICC card in the device). Thus, a host may host a multi-tenant home location register (HLR) and other core network nodes (Gateway General Packet Radio Service (GPRS) support node (GGSN), short message service centre (SMSC), etc.) in HPLMN as a core network service for e.g. all customer operators. All the M2M subscribers of the operators may be registered and stored on hosted HLR. Connectivity is provided as a service to all operators hosted on the platform. On top of the core network service, also a business support system (BSS), e.g. a cloud BSS, may be hosted to provision and manage subscriber data, processes, billing, etc. In accordance with the present disclosure, features for supporting i.a. eUICC are added in the connectivity service platform to meet the new developments within this field (eUICC for M2M connections from vehicles (cars), smart metering, security camera, and also for consumer electronics etc.).

It has been realised that it may be difficult for a connectivity service platform to fall back to another subscription in case of a subscription failure since the connectivity service platform (herein also called the "platform") may have lost its connection with the radio device (herein also called the "device") and may not have an active secondary subscription of the device to fall back to. It can thus not contact the device to get information about which its currently active subscription is, to enable the platform to fall back to the same subscription as the device.

According to an aspect of the present disclosure, there is provided a method performed by a connectivity service platform in a communication network. The method comprises receiving a request message from a radio device via a wireless network connection of a second subscription of the radio device. The method also comprises observing that the connectivity service platform is not enabled to communicate with the radio device via the wireless network connection of the second subscription. The method also comprises determining that the received request message is associated with a fall-back attribute. The method also comprises activating the second subscription in the connectivity service platform in response to the received request message, thereby enabling the connectivity service platform to communicate with the radio device via the wireless network connection of said second subscription of the radio device.

According to another aspect of the present disclosure, there is provided a connectivity service platform for a communication network. The platform comprises processor circuitry, and storage storing instructions executable by said processor circuitry whereby said connectivity service platform is operative to receive a request message from a radio device via a wireless network connection of a second subscription of the radio device. The platform is also operative to observe that the connectivity service platform is not enabled to communicate with the radio device via the wireless network connection of the second subscription. The platform is also operative to determine that the received request message is associated with a fall-back attribute. The platform is also operative to activate the second subscription in the connectivity service platform in response to the received request message, thereby enabling the connectivity service platform to communicate with the radio device via the wireless network connection of said second subscription of the radio device.

According to another aspect of the present disclosure, there is provided a method performed by a radio device in a communication network. The method comprises preparing a request message comprising a fall-back attribute. The method also comprises sending the request message uplink via a wireless network connection of a second subscription of the radio device, for prompting a connectivity service platform to activate the second subscription in the connectivity service platform in response to receiving the request message comprising the fall-back attribute.

According to another aspect of the present disclosure, there is provided a radio device for a communication network. The radio device comprises processor circuitry, and storage storing instructions executable by said processor circuitry whereby said radio device is operative to prepare a request message comprising a fall-back attribute. The radio device is also operative to send the request message uplink via a wireless network connection of a second subscription of the radio device, for prompting a connectivity service platform to activate the second subscription in the connectivity service platform in response to receiving the request message comprising the fall-back attribute.

According to another aspect of the present disclosure, there is provided a computer program product comprising computer-executable components for causing a connectivity service platform to perform an embodiment of a method of the present disclosure when the computer-executable components are run on processor circuitry comprised in the connectivity service platform.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a computer program comprising computer program code which is able to, when run on processor circuitry of a connectivity service platform, cause the connectivity service platform to receive a request message from a radio device via a wireless network connection of a second subscription of the radio device. The code is also able to cause the connectivity service platform to observe that the connectivity service platform is not enabled to communicate with the radio device via the wireless network connection of the second subscription. The code is also able to cause the connectivity service platform to determine that the received request message is associated with a fall-back attribute. The code is also able to cause the connectivity service platform to activate the second subscription in the connectivity service platform in response to the received request message, thereby enabling the connectivity service platform to communicate with the radio device via the wireless network connection of said second subscription of the radio device.

According to another aspect of the present disclosure, there is provided a computer program comprising computer program code which is able to, when run on processor circuitry of a radio device in a communication network, cause the radio device to prepare a request message comprising a fall-back attribute. The code is also able to cause the radio device to send the request message uplink via a wireless network connection of a second subscription of the radio device, for prompting a connectivity service platform to activate the second subscription in the connectivity service platform in response to receiving the request message comprising the fall-back attribute.

According to another aspect of the present disclosure, there is provided a computer program product comprising an embodiment of a computer program of the present disclosure and a computer readable means on which the computer program is stored.

By the radio device including a fall-back attribute in the request message of the second subscription, the platform is informed that it needs to fall back from its current (first) subscription in order to be able to provide the radio device with network connectivity. The fall-back attribute may prompt the platform to change its subscription for the device to the second subscription by means of which the radio device sent the request message. The fall-back attribute may e.g. be any code which is recognised by the platform as a fall-back attribute, e.g. defined in the communication standard or otherwise preprogrammed in the platform. It is also noted that there may be no need for having a synchronization mechanism between the platform and the device/UICC for synchronizing the subscription used.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5a is a schematic flow chart of an embodiment of a method of a connectivity service platform, of the present disclosure.

FIG. 5b is a schematic flow chart of another embodiment of a method of a connectivity service platform, of the present disclosure.

FIG. 6a is a schematic flow chart of an embodiment of a method of a radio device, of the present disclosure.

FIG. 6b is a schematic flow chart of another embodiment of a method of a radio device, of the present disclosure.

FIG. 7 is a schematic block diagram illustrating example embodiments of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
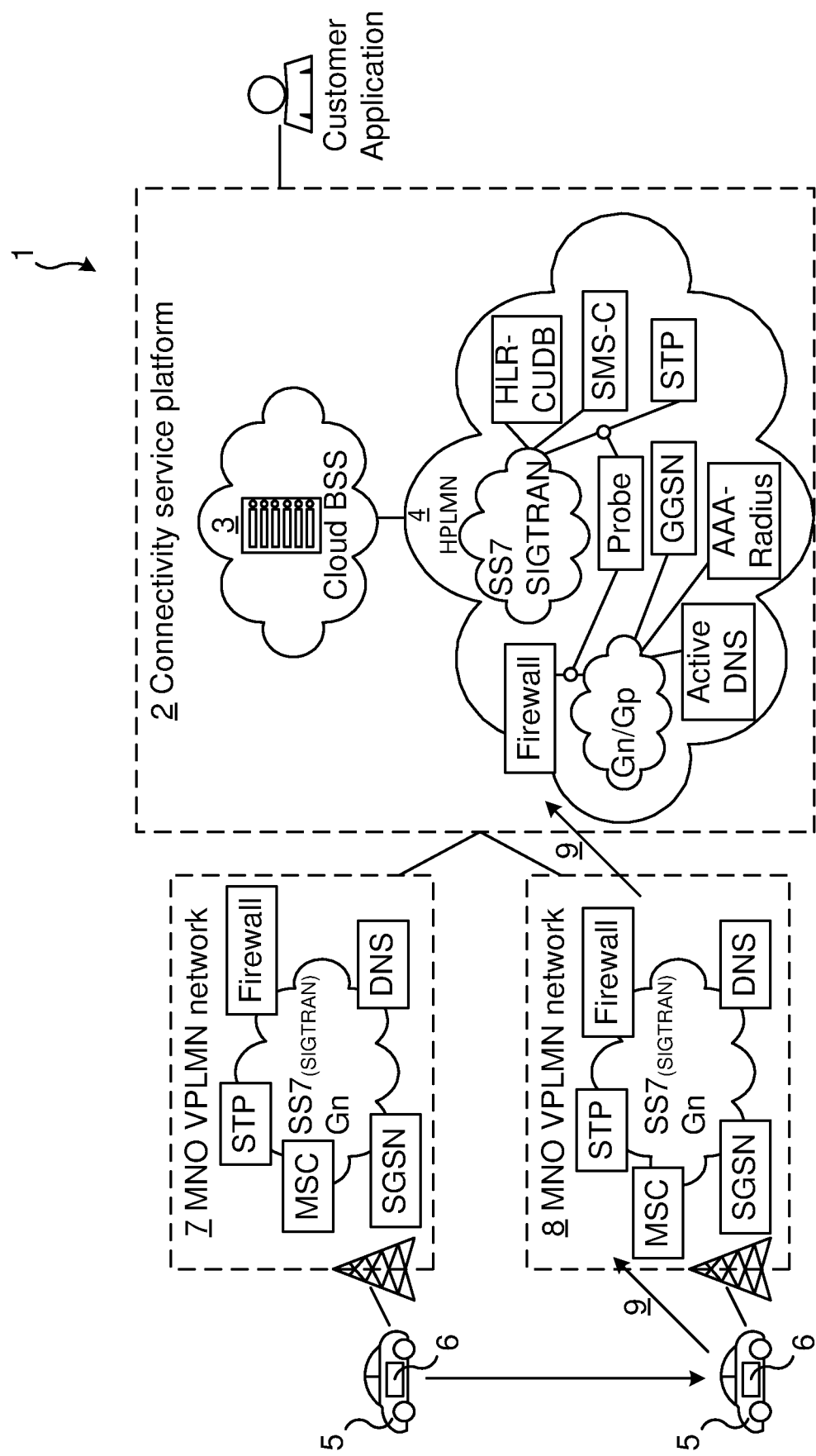
FIG. 1 is a schematic block diagram illustrating an embodiment of a communication network in accordance with the present disclosure.

FIG. 1 is a schematic block diagram illustrating an embodiment of a communication network 1 in accordance with the present disclosure. The communication network 1 comprises a connectivity service platform 2, e.g. an Ericsson Device Connection Platform (EDCP or DCP) for providing CN functionality for customers in the form of several different mobile network operators (MNO:s) for a plurality of radio devices 5 having eUICC 6, e.g. M2M devices 5. Each of the radio devices 5 may be any device or user equipment (UE), mobile or stationary, enabled to communicate over a radio cannel in a communications network, for instance but not limited to e.g. mobile phone, smart phone, modem, sensors, meters, vehicles such as cars or the like, household appliances, medical appliances, media players, cameras, or any type of consumer electronic, for instance but not limited to television, radio, lighting arrangements, tablet computer, laptop, or personal computer (PC). The connectivity service platform 2 of the embodiment of FIG. 1 comprises a cloud business support system (BSS) 3 as well as a cloud home public land mobile network (HPLMN) 4. The HPLMN 4 comprises any regular CN nodes or modules of a radio communication network, e.g. home location register (HLR), Gateway General Packet Radio Service (GPRS) support node (GGSN), short message service centre (SMSC), Signal Transfer Point (STP), Domain Name System (DNS), and authentication, authorization and accounting (AAA) RADIUS, for e.g. Signalling System 7 (SS7) and/or Integrated Services Digital Network (ISDN) communications protocols of signalling transport (SIGTRAN). The radio device 5 has a wireless connection to the network 1 and the platform 2 via a wireless connection provided by a visited PLMN (VPLMN) of a network operator 7 or 8. Each of the VPLMN also comprise the nodes and modules typical for such networks, e.g. a serving general packet radio service, GPRS, support node (SGSN), a mobile switching centre (MSC), a Domain Name System (DNS) server, a Signal Transfer Point (STP), a firewall etc. Each operator 7, 8 has a radio access network (RAN) with base stations via which radio devices may connect wirelessly provided that they have an enabled and active subscription with the operator. The radio device 5 may e.g. send the uplink (UL) request message 9 (as discussed herein) via the MNO 7 or 8 to be handled by the connectivity service platform 2. Since the radio device has an eUICC, the eUICC needs to be flash updated in order to change to a new subscription for its wireless connection. Instructions for the update need typically be received via its wireless connection of an old subscription before the change to the new subscription. The new subscription, may be with the same operator 7 as the old subscription, but it may more commonly be with a new operator 8. It should be noted that embodiments of the present disclosure may also be relevant for radio devices which do not have an eUICC, e.g. having a regular (removable) UICC or SIM card.

In accordance with the present disclosure, the radio device 5 may change subscription (herein called to fall back), without the network side as represented by the platform 2 having done the same. Thus, the UICC 6 (e.g. an eUICC)/device 5 has performed fall-back. Meanwhile the device 5 shall, in real-time, notify the network to make sure the fall-back subscription is both provisioned and active on the network side/platform 2 so that the fall-back can be successful. It is here assumed that the provisioning subscription is the fall-back subscription that is used for fall-back purpose. However, any other subscription may alternatively be used. After the device/UICC fall-back to the provisioning (second) subscription (IMSI), the provisioning IMSI will try to register to the new local HPLMN. The SGSN/MSC may forward the request message 9, e.g. an attach request (incl. authentication request, location update request, etc) to the platform 2, e.g. its HLR. The HLR recognizes that the requested IMSI has the fall-back attribute enabled and may also check that the requested IMSI-UICC pair is allowed by a predefined access control list (ACL). Then the platform 2 and BSS 3 may re-provision the provisioning (second) subscription (IMSI) into HLR if it is not any more provisioned in the HLR, and activate the provisioning IMSI in HLR and BSS. The platform 2 may automatically deactivate the old IMSI in BSS 3 and the HLR, and then accept the request message 9, so that the provisioning IMSI is now also enabled and active on the network side. Hence, the fall-back can be done successfully since both network side/platform 2 and UICC 6/device 5 has activated and enabled the provisioning IMSI.

Figure 2:
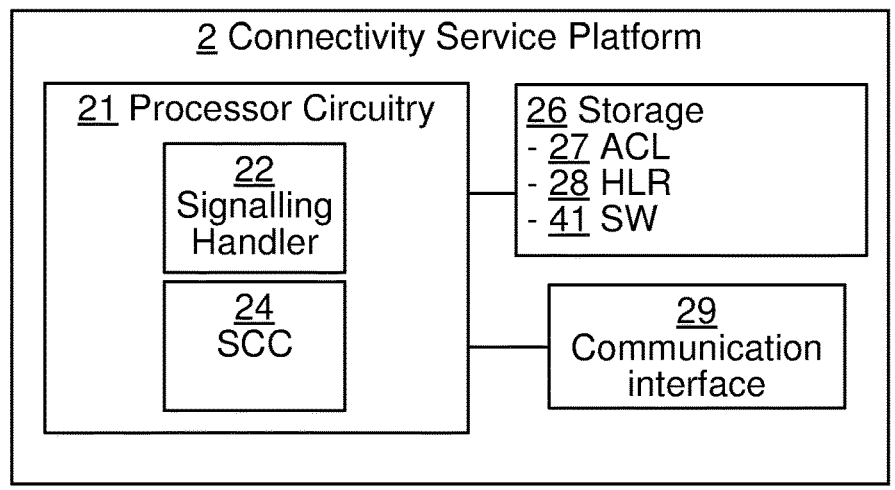
FIG. 2 is a schematic block diagram of an embodiment of a connectivity service platform of the present disclosure.

FIG. 2 is a schematic block diagram of an embodiment of a connectivity service platform 2 of the present disclosure. The platform 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor 21, e.g. an application specific integrated circuit (ASIC), a field programmable gate array (FPGA) or a complex programmable logic device (CPLD). The processor circuitry 21 is configured to run one or several computer program(s) or software (SW) 41 stored in a storage 26 e.g. comprising a memory. The processor circuitry comprises one or several modules 22 and 24 as a result of executing SW 41 in the storage 26, e.g. a registration signalling handler 22 of the home location register (HLR) 28 and/or a subscription change component (SCC) 24. Each of these modules may be formed by separate or dedicated processors of the processor circuitry 21 or by a common processor. The storage 26 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the HLR 28 as well as the access control list (ACL) 27, if present, is part of/stored in the storage 26. The processor circuitry 21 is also configured to store data in the storage 26, as needed. The platform 2 also comprises a communication interface 29 for communication with the radio device 5 as well as with other parts of the communication network 1 such as the operators 7 and 8. The communication interface may comprise a transmitter and a receiver for, in cooperation with the processor circuitry 21, sending and receiving data messages and other digital signalling.

Figure 3:
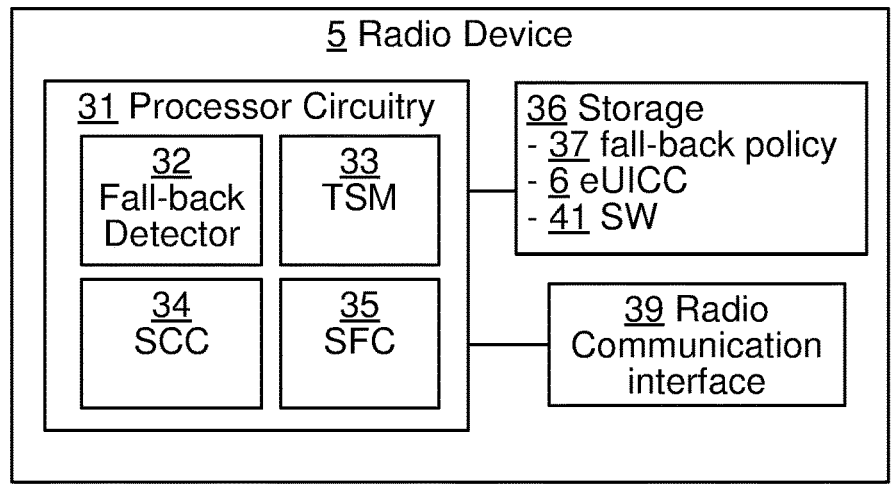
FIG. 3 is a schematic block diagram of an embodiment of a radio device of the present disclosure.

FIG. 3 is a schematic block diagram of an embodiment of a radio device 5 of the present disclosure. The radio device 5 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 41 stored in a storage 36 e.g. comprising a memory. The processor circuitry comprises one or several modules 32-35 as a result of executing SW 41 in the storage 36, e.g. a fall-back detector 32, a traffic and signalling monitor (TSM) 33, a subscription change component (SCC) 34 and/or a subscription fall-back component (SFC) 35 which is below, in FIG. 7, as an example depicted as comprising the fall-back detector 32 as well as the executed fall-back policy 37. Each of these modules may be formed by separate or dedicated processors of the processor circuitry 31 or by a common processor. The storage 36 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the eUICC 6 of the device 5 as well as the fall-back policy 37 is part of/stored in the storage 36. The processor circuitry 31 is also configured to store data in the storage 36, as needed. The radio device 5 also comprises a radio communication interface 39 for communication with the platform 2 as well as with other parts of the communication network 1 such as the operators 7 and 8. The communication interface may comprise a transmitter and a receiver, as well as an antenna, for, in cooperation with the processor circuitry 31, sending and receiving data messages and other digital signalling wirelessly.

Figure 4:
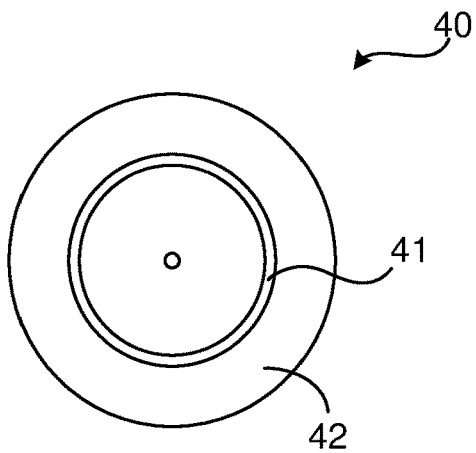
FIG. 4 is a schematic illustration of an embodiment of a computer program product of the present disclosure.

FIG. 4 illustrates a computer program product 40. The computer program product 40 comprises a computer readable medium 42 comprising a computer program 41 in the form of computer-executable components 41. The computer program/computer-executable components 41 may be configured to cause the platform 2 or the radio device 5 as discussed herein to perform an embodiment of a method of the present disclosure. The computer program/computer-executable components may be run on the processor circuitry 21 of the platform 2 or the processor circuitry 31 of the radio device 5 for causing the platform/radio device to perform the method. The computer program product 40 may e.g. be comprised in a storage 26 or 36 comprised in the platform/radio device and associated with the processor circuitry 21 or 31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

FIG. 5a is a flow chart illustrating an embodiment of a method of the present disclosure. The method is performed by a connectivity service platform 2 in a communication network 1. The platform receives 51 a request message 9 from a radio device 5 via a wireless network connection of a second subscription of the radio device. However, the second subscription is not active for the device 5 in the platform 2 (the platform may e.g. have a first subscription active for the device 5). Thus, the platform 2 observes 52 that the connectivity service platform 2 is not enabled to communicate with the radio device via the wireless network connection of the second subscription. However, a fall-back attribute may be associated with the request message 9. The platform can therefore determine 53 that the received 51 request message 9 is associated with the fall-back attribute. For instance, the network side (e.g. the platform 2) may store the fall-back attribute for the IMSI of the device 5, and check if the IMSI has the fall-back attribute when receiving the request message from device 5. Additionally or alternatively, the device 5 may embed the fall-back attribute into the request message, which may make the fall-back IMSI more easily recognisable to the platform 2. Thus, the fall-back attribute may in some embodiments be comprised in the request message, as is further discussed in respect of embodiments of the method performed by the radio device 5. In response to the received 51 request message 9 comprising the fall-back attribute, the platform 2 activates 55 the second subscription in the connectivity service platform 2 for the device 5. Thereby, the connectivity service platform 2 is enabled to communicate with the radio device 5 via the wireless network connection of said second subscription of the radio device.

FIG. 5b is a schematic flow chart of another embodiment of a method of the connectivity service platform 2, of the present disclosure. The steps of receiving 51 a request message, observing 52 that the connectivity service platform 2 is not enabled, determining 53 that the received 51 request message 9 comprises a fall-back attribute and activating 55 the second subscription are as discussed in relation to FIG. 5a. Further, the platform 2 may in some embodiments, prior to the activating 55 of the second subscription, check 54 that an access control list (ACL) 27 stored in the platform 2 includes a device identifier identifying the radio device 5. The ACL may be used to ensure that the device 5 has the right to prompt the platform 2 to fall back to the second subscription. Otherwise, any device 5 might be able to get the platform 2 to use a subscription which the device 5 is not allowed to use. The device identifier may be any code somehow identifying the device 5. The device identifier in the ACL may e.g. be a Universal Integrated Circuit Card (UICC) e.g. an embedded UICC (eUICC) identifier (ID) identifying the UICC or eUICC 6 in the radio device 5 and/or an International Mobile Station Equipment Identity (IMEI) for the radio device 5. The ACL may additionally comprise a subscription identifier, identifying the second subscription, which is paired with the device identifier in the ACL. The subscription identifier may e.g. be an International mobile subscriber identity (IMSI) of the second subscription. With such paired entries in the ACL, the platform 2 may check 54 whether the device 5 (by the device identifier) is allowed to instruct the platform 2 to fall back 55, and which subscription (by the subscription identifier) the device 5 is allowed fall back to.

FIG. 6a is a schematic flow chart of an embodiment of a method of the radio device 5, of the present disclosure. The radio device 5 prepares 63 the request message 9, which (as discussed herein) comprises a fall-back attribute. Then, the device 5 sends 64 the request message 9 uplink via a wireless network connection of a second subscription of the radio device 5. Thereby, the device 5 attempts to prompt the platform 2 to activate the second subscription in the connectivity service platform in response to receiving 51 the request message 9 comprising the fall-back attribute.

FIG. 6b is a schematic flow chart of another embodiment of a method of the radio device 5, of the present disclosure. The steps of preparing 63 and sending 64 the request message are as discussed in relation to FIG. 6a. Further, the method of the radio device may comprise, before sending 64 the request message 9, being enabled 61 to communicate via a wireless network connection of a first subscription. Thus, the device 5 as well as the platform 2 may have the first subscription of the device active, providing the device with a connection of the first subscription. Then, for some reason (possibly some failure of the first subscription connection), the device 5 falls back 62 to the second subscription of the radio device, thereby enabling the radio device 5 to obtain the wireless network connection of the second subscription instead of the first subscription. This results in the need to get the platform to also fall back to the second subscription, in accordance with the present disclosure. This is one example of a case where embodiments of the present disclosure may be convenient. In some embodiments, the falling back 62 is in accordance with a predetermined fall-back policy 37 stored in the radio device 5. Such a stored fall-back policy 37 may e.g. state that in case of a failure of the network connection of the first subscription, the device 5 should fall back 62 to the second subscription. A corresponding fall-back policy may also be stored in the platform 2, e.g. for dictating how the platform 2 should fall back in response to receiving 51 the fall-back attribute.

In some embodiments of the present disclosure, the connectivity service platform 2, before receiving 51 the request message 9, is enabled to communicate with the radio device 5 via a wireless network connection of a first subscription of the radio device.

In some embodiments of the present disclosure, the fall-back attribute is a code which is predefined in and recognised by the platform 2 as a fall-back attribute.

In some embodiments of the present disclosure, the radio device 5 comprises an embedded Universal Integrated Circuit Card (eUICC) 6. However, also radio devices with other UICC 6 or subscriber identity module (SIM) card or element may be used with embodiments of the present disclosure. In some embodiments, the second subscription is a provisioning subscription of the eUICC 6.

In some embodiments of the present disclosure, the request message 9 is a registration request for registering; or an attach request for attaching, or a location update request for updating the location of, or an authentication request for authenticating, or a short message service (SMS) request from, or a packet data protocol (PDP) context create or activation request from, the radio device 5 via the second subscription. These are just some examples of possible request messages 9 which may be used in embodiments of the present disclosure.

Example

Reference is made to FIG. 7. The premise for this proposed example is that both the radio device 5 and the platform 2 have enabled, and are possible communicating by means of, the first subscription of MNO 7.

Step A—Device 5 side (eUICC 6) detects a network connectivity failure.

Step B—Device 5/eUICC 6 executes its fall-back policy 37, whereby in the case of network connectivity failure, the eUICC Subscription Fall-back Component (SFC) 35 determines to fall-back 62 to the second subscription e.g. its provisioning subscription (IMSI). The eUICC 6 enables the provisioning subscription, and disables the current (first) subscription of MNO 7.

Step C—The eUICC 6 changes its subscription to the provisioning subscription (IMSI), and re-attaches to the network using the provisioning subscription (IMSI).

Step D—The eUICC 6 re-attaches to the network/platform 2 by using the provisioning IMSI of the second subscription. The registration request message 9 (incl. authentication request, location update request, etc) of the provisioning IMSI is received 51 by HLR 28 registration signaling handler 22 of the platform 2.

Step E—The registration signaling handler 22 of the HLR 28 observes 52 that the IMSI is in deactivated state or even not any more provisioned in the HLR. However, it also determines 53 that this is an IMSI that has the fall-back attribute enabled for fall-back purpose. HLR Registration signaling handler 22 will then check 54 the ACL 27 (IMSI) in HLR 28, to check whether the registration request of the provisioning IMSI shall be accepted or not. The HLR ACL 27 contains a list of allowed IMSI-eUICC pairs. It checks that the provisioning IMSI-eUICC pair is in the list of allowed IMSI-eUICC pairs, why it determines that the registration request of the provisioning IMSI shall be accepted.

Step F—The HLR Registration signaling handler 22 notifies the BSS 3 to enable and activate the provisioning subscription (IMSI) in the BSS 3 and HLR 28.

Step G—If the provisioning IMSI is still provisioned in the HLR 28, the BSS 3 will enable and activate 55 the provisioning (second) subscription in the BSS and HLR, and disable and deactivate the current (first) subscription of MNO 7. On the other hand, if the provisioning IMSI is not any more provisioned in the HLR 28, the BSS 3 will re-provision the provisioning subscription into the HLR (by default, the BSS may store provisioning subscriptions permanently). Then, the BSS 3 will enable and activate 55 the provisioning subscription in both the BSS and HLR, and disable and deactivate the current (first) subscription of MNO 7.

Step H—The BSS 3 notifies the HLR registration signaling handler 22 that it has provisioned and activated the provisioning (second) subscription in the BSS and HLR. Then, it is time to accept the registration request 9 of the provisioning IMSI. A reason that the HLR registration accept message is not sent until now is that HLR 28 shall guarantee to acquire the correct and updated subscriber data provisioned from BSS 3 before accepting the registration request 9. Therefore, during the attach process, the HLR 28 can insert the correct subscriber data (with the correct subscriber state —active bearers/connectivity state) into SGSN/MSC where the device 5/eUICC 6 is attaching to.

Step I—The registration request 9 of the provisioning (second) subscription IMSI is accepted by the HLR 28. The provisioning subscription IMSI is now active on both network/platform 2 side and eUICC 6 side, therefore the eUICC can recover the connectivity successfully with the provisioning IMSI. The fall-back is thus successful.

It should be noted that if there are other available subscriptions (operational subscription) existing on both the eUICC 6 and platform 2 that may have a fall-back attribute enabled, it is also possible to fall-back to such a subscription. Embodiments of the present disclosure are thus not restricted to fall-back to the provisioning subscription.

Below follow some other aspects of the present disclosure.

According to an aspect of the present disclosure, there is provided a connectivity service platform 2 for a communication network 1. The platform comprises means (e.g. the processor circuitry 21 in cooperation with the communication interface 29) for receiving 51 a request message from a radio device 5 via a wireless network connection of a second subscription of the radio device. The platform 2 also comprises means (e.g. the processor circuitry 21, such as the signal handler 22 and/or the SCC 24) for observing 52 that the connectivity service platform 2 is not enabled to communicate with the radio device via the wireless network connection of the second subscription. The platform 2 also comprises means (e.g. the processor circuitry 21, such as the signal handler 22 and/or the SCC 24) for determining 53 that the received request message is associated with a fall-back attribute. The platform 2 also comprises means (e.g. the processor circuitry 21, such as the signal handler 22 and/or the SCC 24) for activating 55 the second subscription in the connectivity service platform 2 in response to the received request message, thereby enabling the connectivity service platform to communicate with the radio device 5 via the wireless network connection of said second subscription of the radio device.

According to another aspect of the present disclosure, there is provided a radio device 5 for a communication network 1. The radio device comprises means (e.g. the processor circuitry 31 in cooperation with the radio communication interface 39) for preparing 63 a request message comprising a fall-back attribute. The radio device comprises means (e.g. the processor circuitry 31 in cooperation with the radio communication interface 39) for sending 64 the request message uplink via a wireless network connection of a second subscription of the radio device 5, for prompting a connectivity service platform 2 to activate the second subscription in the connectivity service platform in response to receiving the request message comprising the fall-back attribute.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a connectivity service platform in a communication network, the method comprising:
   receiving a request message from a radio device previously enabled to communicate with the connectivity service platform via a wireless network connection of a first subscription of the radio device, the request message identifying a second subscription of the radio device and received via a wireless network connection of the second subscription of the radio device;
   observing that the connectivity service platform is not enabled to communicate with the radio device via the wireless network connection of the second subscription;
   determining that the received request message is associated with a fallback attribute;
   activating the second subscription in the connectivity service platform in response to the received request message; and
   accepting the request message, thereby enabling the connectivity service platform to communicate with the radio device via the wireless network connection of the second subscription of the radio device.

2. The method of claim 1, further comprising, before the activating of the second subscription, checking that an access control list stored in the platform includes a device identifier identifying the radio device.

3. The method claim 2, wherein the device identifier is at least one of a Universal Integrated Circuit Card (UICC), identifier and an International Mobile Station Equipment Identity (IMEI).

4. The method of claim 2, wherein the checking comprises checking that the access control list comprises a subscription identifier, identifying the second subscription, which is paired with the device identifier in the access control list.

5. The method of claim 4, wherein the subscription identifier is an International mobile subscriber identity (IMSI).

6. The method of claim 1, wherein the fallback attribute is a code which is predefined in, and recognized by, the connectivity service platform as a fallback attribute.

7. The method of claim 1, wherein the connectivity service platform is enabled to communicate with the radio device comprising an embedded Universal Integrated Circuit Card (eUICC).

8. The method of claim 1, wherein the request message is one of:
   a registration request for registering the radio device via the second subscription;
   an attach request for attaching the radio device via the second subscription;
   a location update request for updating the location of the radio device via the second subscription;
   an authentication request for authenticating the radio device via the second subscription;
   a short message service (SMS) request from the radio device via the second subscription;
   a packet data protocol (PDP) context create or activation request from the radio device via the second subscription.

9. A connectivity service platform for a communication network, the platform comprising:
   processor circuitry; and
   memory containing instructions executable by the processor circuitry whereby the connectivity service platform is operative to:
   receive a request message from a radio device enabled to communicate with the connectivity service platform via a wireless network connection of a first subscription of the radio device, the request message identifying a second subscription of the radio device and received via a wireless network connection of the second subscription of the radio device;
   observe that the connectivity service platform is not enabled to communicate with the radio device via a wireless network connection of the second subscription;
   determine that the received request message is associated with a fallback attribute; activate the second subscription in the connectivity service platform in response to the received request message;
   accepting the request message, thereby enabling the connectivity service platform to communicate with the radio device via the wireless network connection of the second subscription of the radio device.

10. A method performed by a radio device in a communication network, the radio device enabled to communicate with a connectivity service platform via a wireless connection of a first subscription of the radio device, the method comprising:
    preparing a request message comprising a fallback attribute, said request message identifying a second subscription of the radio device; and
    sending the request message uplink via a wireless network connection of the second subscription of the radio device, for prompting a connectivity service platform to activate the second subscription in the connectivity service platform in response to the connectivity service platform receiving and accepting the request message comprising the fallback attribute.

11. The method of claim 10:
    further comprising falling back to the second subscription of the radio device, thereby enabling the radio device to obtain the wireless network connection of the second subscription instead of the first subscription.

12. The method of claim 11, wherein the falling back is in accordance with a predetermined fallback policy stored in the radio device.

13. The method of claim 10, wherein the radio device comprises an embedded Universal Integrated Circuit Card (eUICC).

14. The method of claim 13, wherein the second subscription is a provisioning subscription of the eUICC.

15. A radio device for a communication network, the radio device enabled to communicate with a connectivity service platform via a wireless connection of a first subscription of the radio device and comprising:
  processor circuitry; and
  memory containing instructions executable by the processor circuitry whereby the radio device is operative to:
    prepare a request message comprising a fallback attribute, said request message identifying a second subscription of the radio device; and
    send the request message uplink via a wireless network connection of the second subscription of the radio device, for prompting a connectivity service platform to activate the second subscription in the connectivity service platform in response to the connectivity service platform receiving and accepting the request message comprising the fallback attribute.

16. A computer program product stored in a non-transitory computer readable medium for controlling a connectivity service platform in a communication network, the computer program product comprising software instructions which, when run on processor circuitry of the connectivity service platform, causes the connectivity service platform to:
  receive a request message from a radio device enabled to communicate with the connectivity service platform via a wireless network connection of a first subscription of the radio device, the request message identifying a second subscription of the radio device and received via a wireless network connection of the second subscription of the radio device;
  observe that the connectivity service platform is not enabled to communicate with the radio device via the wireless network connection of the second subscription;
  determine that the received request message is associated with a fallback attribute;
  activate the second subscription in the connectivity service platform in response to the received request message; and
  accepting the request message, thereby enabling the connectivity service platform to communicate with the radio device via the wireless network connection of the second subscription of the radio device.

17. A computer program product stored in a non-transitory computer readable medium for controlling a radio device in a communication network, the radio device enabled to communicate with a connectivity service platform via a wireless connection of a first subscription of the radio device, the computer program product comprising software instructions which, when run on processor circuitry of the radio device, causes the radio device to:
  prepare a request message comprising a fallback attribute, said request message identifying a second subscription of the radio device; and
  send the request message uplink via a wireless network connection of the second subscription of the radio device, for prompting a connectivity service platform to activate the second subscription in the connectivity service platform in response to the connectivity service platform receiving and accepting the request message comprising the fallback attribute.

* * * * *